United States Patent
Sicking et al.

(10) Patent No.: US 7,460,437 B2
(45) Date of Patent: Dec. 2, 2008

(54) SEISMIC DATA PROCESSING METHOD AND SYSTEM FOR MIGRATION OF SEISMIC SIGNALS INCORPORATING AZIMUTHAL VARIATIONS IN THE VELOCITY

(75) Inventors: Charles Sicking, Plano, TX (US); Stuart Nelan, Melissa, TX (US); William "Bill" H. McLain, Bend, OR (US)

(73) Assignee: Weinman GeoScience, Dallas, TX (US)

( * ) Notice: Subject to any disclaimer, the term of this patent is extended or adjusted under 35 U.S.C. 154(b) by 0 days.

(21) Appl. No.: 11/619,518

(22) Filed: Jan. 3, 2007

(65) Prior Publication Data

US 2008/0159076 A1 Jul. 3, 2008

(51) Int. Cl.
*G01V 1/28* (2006.01)
*G01V 1/22* (2006.01)
(52) U.S. Cl. .............................. 367/38; 367/50; 367/51; 367/57
(58) Field of Classification Search .................... 367/57, 367/38, 50, 51, 53; 181/111–112
See application file for complete search history.

(56) References Cited

U.S. PATENT DOCUMENTS 5,012,674 A * 5/1991 Millheim et al. ......... 73/152.03
5,109,697 A * 5/1992 Millheim et al. ......... 73/152.11

(Continued)

OTHER PUBLICATIONS

Castonguya et al. Application of reprocessed vintage seismic reflection lines for an improved subsurface imagery ofhte Laurentian margin architecture; souterhn Quebec Appalachians. Geological Society of America. Northeastern section. 37th Annual meeting. Mar. 25-27, 2002.*

(Continued)

*Primary Examiner*—Jack W Keith
*Assistant Examiner*—Scott A Hughes
(74) *Attorney, Agent, or Firm*—Michael A. Rahman (57) ABSTRACT

A method and system for seismic data processing utilizes azimuthal variations in the velocity of seismic signals. The system and method utilizes a plurality of seismic energy sources that are located at known positions at the surface of the earth. The seismic energy sources generate seismic signals that propagate downward into the earth. Some of the seismic signals are reflected and diffracted by various subsurface layers and are returned to the surface of the earth. The returned seismic signals are received by a plurality of receivers. The method includes the step of determining the distance from an energy source to an image point. A fast travel time of the seismic signal from the energy source to the image point is determined, and a slow travel time of the seismic signal from the energy source to the image point is determined. The azimuth angle between the energy source and the surface location of the image point is calculated. A first travel time of the seismic signal traveling from the energy source to the image point is calculated. A second travel time of the seismic signal traveling from the image point to the seismic receiver is calculated. The total travel time is calculated by adding the first and second travel time. The amplitudes from the recorded signal at the total travel time are phase adjusted and added into the output image at the image point. The foregoing steps are repeated for a plurality of image points beneath the surface of the earth and the total travel time is calculated.

9 Claims, 8 Drawing Sheets

U.S. PATENT DOCUMENTS

| | | | |
|---|---|---|---|
| 6,611,761 B2 * | 8/2003 | Sinha et al. | 702/6 |
| 6,681,184 B2 * | 1/2004 | Jenner et al. | 367/51 |
| 6,714,480 B2 * | 3/2004 | Sinha et al. | 367/31 |
| 6,714,873 B2 * | 3/2004 | Bakulin et al. | 702/14 |
| 6,898,147 B2 * | 5/2005 | Jenner et al. | 367/51 |
| 6,904,368 B2 * | 6/2005 | Reshef et al. | 702/17 |
| 6,930,616 B2 * | 8/2005 | Tang et al. | 340/854.4 |
| 2002/0116128 A1 * | 8/2002 | Sinha et al. | 702/6 |
| 2003/0167835 A1 * | 9/2003 | Sinha et al. | 73/152.16 |
| 2004/0109387 A1 * | 6/2004 | Jenner et al. | 367/14 |
| 2004/0257911 A1 * | 12/2004 | Tang et al. | 367/81 |
| 2006/0256655 A1 * | 11/2006 | Sinha et al. | 367/31 |
| 2006/0285437 A1 * | 12/2006 | Sinha et al. | 367/37 |

OTHER PUBLICATIONS

Combellas et al. Sequence Stratigraphic Analysis of a Semiregional Depth Migrated Profile, Maturin Sub-Basin, Eastern Venezuela Basin. 68th Annu. Seg. Int. Mtg. New Orleans Sep. 13-18, 1998.*

* cited by examiner

SEISMIC DATA PROCESSING METHOD AND SYSTEM FOR MIGRATION OF SEISMIC SIGNALS INCORPORATING AZIMUTHAL VARIATIONS IN THE VELOCITY

FIELD OF THE INVENTION

The invention relates generally to seismic data processing. More specifically, the invention relates to a seismic data migration method and system that incorporates azimuth variations in the velocity of propagation of seismic signals.

BACKGROUND OF THE INVENTION

Seismic surveys are used to evaluate the geometry and properties of subsurface rocks. The subsurface geometry and properties often indicate hydrocarbon deposits.

In seismic surveys, seismic energy sources are used to generate seismic signals at or near the surface of the earth. The seismic signals propagate downward into the earth and are reflected and diffracted by discontinuities in the subsurface. Some of the signals are returned back to the surface where they are detected by seismic sensors.

Seismic sensors are deployed on the surface of the earth. A seismic sensor may be a transducer that converts the seismic signals into electrical signals. The electrical signals from each sensor are transmitted and recorded for processing.

The sensors record the amplitude of the seismic signals arriving at the surface location of the sensor and also record the round-trip travel time of the signals from the seismic energy sources on the surface to a reflector and back to the surface. A display of the raw recorded signals does not provide a true picture of the reflectors in the subsurface.

The subsurface is a non-uniform medium, which causes spatial variations in the propagation velocity of the seismic signals, resulting in variations in the direction of propagation of the signals. These effects of the non-uniform medium on the seismic signals are called interferences.

Figure 1:
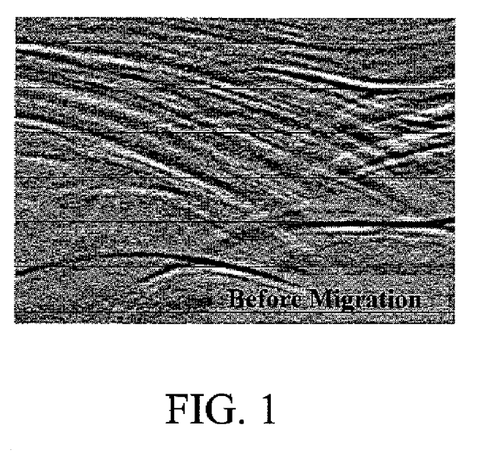
FIG. 1 shows an image of a geological structure before migration, wherein the dipping bed reflections and the fault reflection overlay each other and cause the subsurface structure to appear very confusing.

At the boundaries between rock layers and faults, a part of the seismic signal undergoes reflection. The reflected signals from many reflectors arrive at the same receiver at the same time, which causes the recorded signals to appear very mixed. FIG. 1 shows recorded seismic signals that are not corrected. As will be understood by those skilled in the art, in FIG. 1, the dipping layer reflections and the fault reflection overlay each other and the subsurface structure is not resolved. As a result, the subsurface structure appears very confusing.

Figure 2:
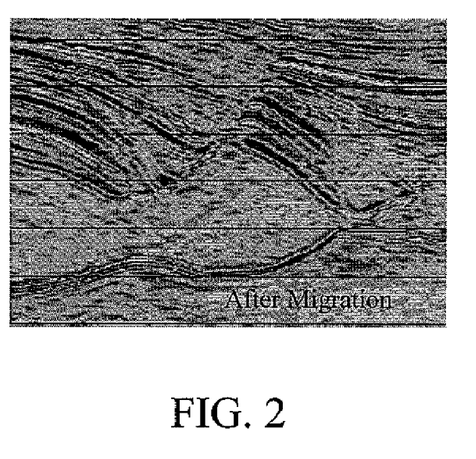
FIG. 2 shows an image of a geological structure after migration of the underlying data of the seismic signals illustrated in FIG. 1, wherein the recorded signals have been moved to the locations of the original reflections.

In seismic data processing, a numerical method known as migration is used to focus the recorded seismic signals and to move (i.e., migrate) the reflections in the seismic data to their correct spatial positions. In migrated seismic data, the locations of geological structures such as faults are more accurately represented, thereby improving seismic interpretation and mapping. FIG. 2 shows the seismic signals after migration is applied to the seismic signals shown in FIG. 1. As will be understood by those skilled in the art, the recorded signals have been moved (i.e., migrated) to the spatial location of the rock boundaries that caused the reflections. Consequently, the fault and the reflecting layers are well focused.

There are many different migration methods. Examples include: frequency domain, finite difference, and Kirchhoff migration. In general, these migration methods involve the back propagation of the seismic signals recorded at the surface of the earth to the region where it was reflected. In Kirchhoff migration, the back propagation is calculated by using the Kirchhoff integral representation. According to Kirchhoff integration, the signals recorded at the surface that originated at a given subsurface image location are summed. In order to compute the Kirchhoff integration, the travel times from the subsurface image location to each source and receiver location at the surface are required. The computation of the travel times requires a model of the seismic propagation velocity.

In existing methods, the starting seismic velocity model is determined as an independent processing step before migration. Errors in the velocity model are determined by examining the output of the migration. The velocity model is updated to correct for the measured errors and migration is applied to the data using the updated velocity model. When the errors in the velocity model have been reduced to a satisfactory level, the final migration is applied.

Figure 3:
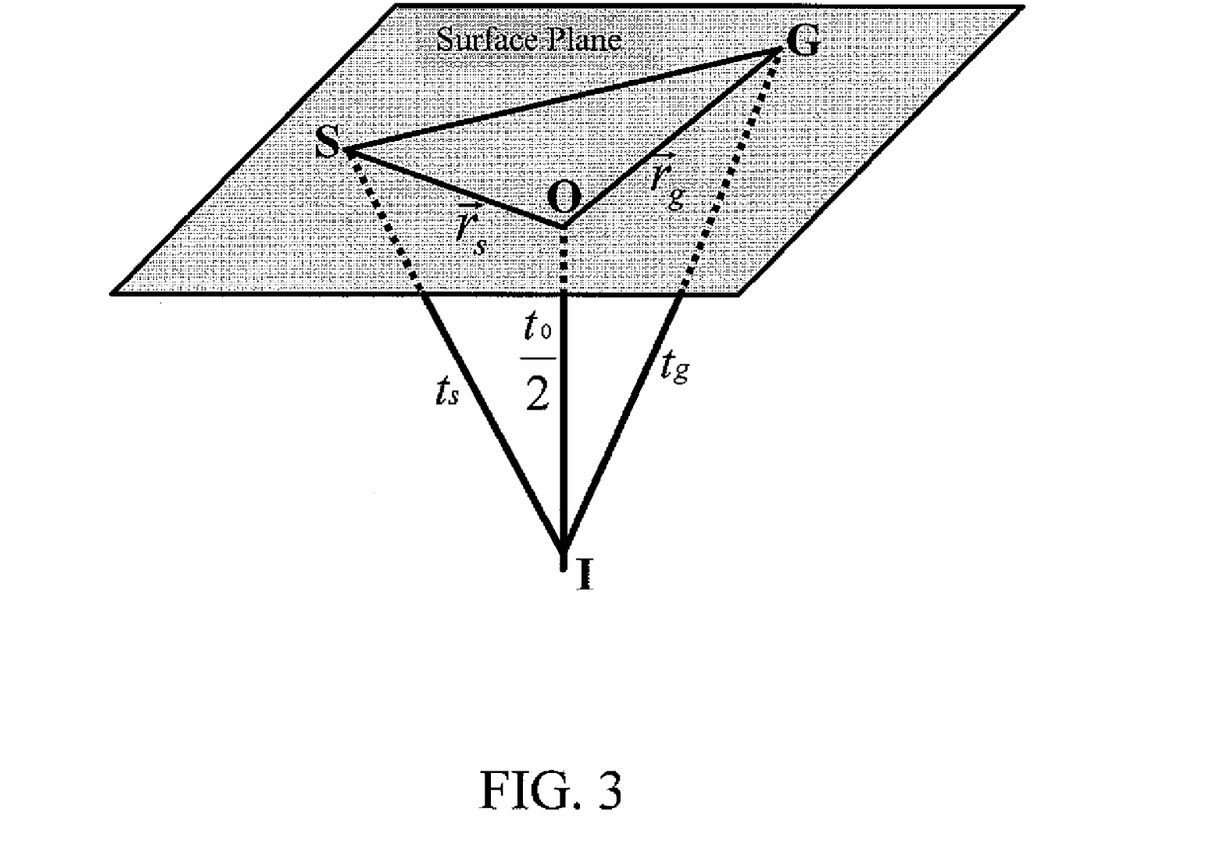
FIG. 3 shows the field geometry for a seismic signal generated at a single source, reflected from a single image point and recorded at a single receiver.

FIG. 3 shows the field geometry for a seismic signal generated at a single source, reflected from a single image and recorded at a single receiver, i.e., a seismic sensor. An analytical expression for the travel time of a seismic signal, t, from the source S to the image point I to the receiver G is given by, $$t = \sqrt{\left(\frac{t_0}{2}\right)^2 + \frac{|\vec{r}_s|^2}{V_{rms}^2} + C|\vec{r}_s|^4} + \sqrt{\left(\frac{t_0}{2}\right)^2 + \frac{|\vec{r}_g|^2}{V_{rms}^2} + C|\vec{r}_g|^4}$$

where, $$C = \frac{1}{4} \frac{\mu_2^2 - \mu_4}{\left(\frac{t_0}{2}\right)^2 \mu_2^4}$$

and, $$\mu_j = \frac{1}{t_0/2} \sum_{i=1}^{N} v_i^j \Delta t_i$$

and, $v_i$ is the interval velocity of the seismic signal (i.e., seismic wave) of each earth layer from the surface to the depth of the image point and $V_{rms}$ is the Root Mean Square (RMS) velocity of the seismic signal from the surface to the image point.

$$V_{rms}^2 = \frac{1}{t_0} \sum_{i=1}^{N} v_i^j \Delta t_i$$

This analytical equation for the computation of travel time of the seismic signal is a fourth order approximation. The fourth order equation provides more accurate travel times than the second order equation when the earth velocity model has a gradient increasing with depth.

An alternate method for computing the travel time of the seismic signal utilizes ray tracing. According to the ray tracing method, a table or grid of the subsurface is populated with a value corresponding to the interval velocity of the seismic signal at each point in the subsurface. As will be understood by those skilled in the art, a seismic signal is generated at the image location, and the signal is propagated through the grid using finite differences, eikonal equation solutions, or direct ray tracing using Snell's law. The transit time of the signal from the image location to each of the source and receiver locations is measured and used in the migration. Ray trace solutions account for the curvature of rays in the earth caused by the vertical velocity gradient, which produces superior quality images. Pre-computing the travel time tables provides for a significant improvement in efficiency. The travel time tables are computed and stored for later use in the imaging. Pre-computing and storing the travel time tables also allows for the inclusion of azimuth variations in the velocity.

In existing time migration methods, it is assumed that there are no azimuthal variations of the velocity. However, for geologic regimes under tectonic stress, it is well documented that azimuthal variations of the velocity exists. Fractures resulting from stress fields cause additional azimuthal variations of the velocity. In existing methods, the analysis for azimuthal variations in velocity is carried out before imaging. The recorded seismic signals are gathered in azimuth corridors according to the azimuth direction between the source location and the receiver location and then imaged using isotropic imaging. A different velocity model is used for each of the azimuth corridors. For recorded signals that have not been focused using migration, the azimuthal analysis is compromised by the mixing of signals from multiple reflection locations. In addition, the gathering of the data according to the azimuth between the surface locations of the source and receiver ignores the real propagation direction of the signal from the source to the reflection point and from the reflection point to the receiver.

Accordingly, there is a need for a seismic data processing method and system that incorporates azimuthal variations of velocity in migration of the seismic signals for improved imaging of geological structures.

SUMMARY OF THE INVENTION

The invention is a method and system for seismic data processing utilizing the azimuthal variations in the velocity of seismic signals. In one embodiment, the system and method utilizes a plurality of seismic energy sources located at known positions at the surface of the earth. The seismic energy sources generate seismic signals that propagate downward into the earth. Some of the seismic signals are reflected and diffracted by various sub-surface layers and are returned to the surface of the earth. The returned seismic signals are received by a plurality of receivers.

The method includes the step of determining the distance from an energy source to an image point. A fast travel time of the seismic signal from the energy source to the image point is determined, and a slow travel time of the seismic signal from the energy source to the image point is determined.

The azimuth angle between the energy source and the surface location of the image point is calculated. A first travel time of the seismic signal traveling from the energy source to the image point is calculated. A second travel time of the seismic signal traveling from the image point to the seismic receiver is calculated. The total travel time is calculated by adding the first and second travel time. The amplitudes from the recorded signal at the total travel time are phase adjusted and added into the output image at the image point. The foregoing steps are repeated for a plurality of image points beneath the surface of the earth and the total travel time is calculated.

The fast travel time is calculated using the distance from the energy source to the surface location of the image point, the travel time from the surface location of the image point to the image point, and a fast velocity table. The slow travel time is calculated using the distance from the surface location of the image point to the seismic receiver, the travel time from the surface location of the image point to the image point, and a slow velocity table. The azimuthal angle between the energy source and the surface location of the image point is calculated using the respective coordinates.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

In one aspect, the seismic data processing method and system relates to Kirchhoff pre-stack time migration. As will be apparent to those skilled in the art, the term pre-stack refers to a recorded signal whereby the source location and receiver location geometries have been retained. A seismic data processing method commonly referred to as "stacking" can be applied to recorded signals. Stacking modifies each of the recorded signals and then sums it with adjacent signals to produce signals where the source and receiver are co-located. As will be understood by those skilled in the art, pre-stack migration is applied to seismic data in which the source and the receiver for each input trace are at spatially separated surface locations (i.e., not co-located). Pre-stack migration provides an improved quality image because the signals are not stretched and mixed before the migration process is applied.

The seismic data processing method and system provides for improved imaging of geological structures by incorporating azimuthal variations of the velocity of the seismic signals. In one embodiment, a Kirchhoff pre-stack time migration incorporates variations in the velocity of the seismic signals as a function of azimuth.

In order to incorporate the azimuthal variations in the velocity of propagation for seismic signals into the Kirchhoff migration method, it is necessary to measure the parameters for the azimuthal variations. Three parameters are required: velocity, azimuth direction, and azimuth magnitude.

The velocity is determined in the following manner. The starting seismic velocity model is determined before migration as an independent processing step. A first pass of migration is applied at a large number of locations and errors in the velocity model are determined by examining the output of the migration. The velocity model is updated to correct for the measured errors and migration is applied to the data using the updated velocity model. When the errors in the velocity model have been reduced to a satisfactory level, the velocity model is finalized.

The azimuthal magnitude and direction parameters can be derived using the unmigrated signals. A large number of signals are collected together that are in the same surface location. These signals are combined and then sorted by the azimuth direction between the source and receiver surface locations. By observing the change in travel time as a function of azimuth for selected reflection events, the values of the magnitude and direction parameters can be determined. This analysis is repeated at a large number of surface locations and for a number of reflections at each location. A volume of azimuthal magnitude and direction parameters is created for use in azimuthal migration.

Figure 4:
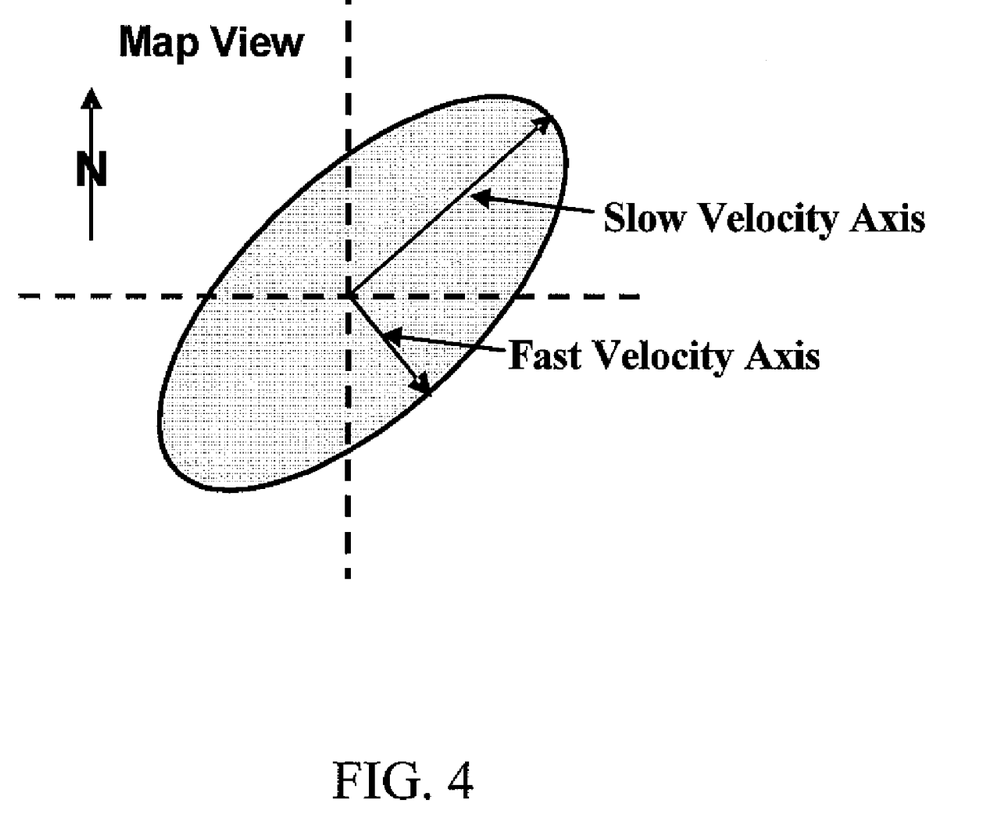
FIG. 4 shows the variation of the velocity of the seismic signal as a function of theta, represented by an elliptical function.

The application of azimuthal migration assumes that the azimuthal variations of velocity fit an elliptical model. The direction of the fast velocity and the slow velocity are assumed to be perpendicular to each other. Because travel times are inversely proportional to velocity, the major axis of the ellipse may represent the slow velocity and the minor axis of the ellipse may represent the fast velocity. An example of this ellipse is shown in FIG. 4.

Isotropic migration using a stored travel time table approach requires that one travel time table be stored for each output image surface location. For azimuthal migration, two travel time tables must be stored. The travel time computation uses the velocity and azimuthal magnitude values to compute the two travel time tables for a selected surface location.

Figure 5:
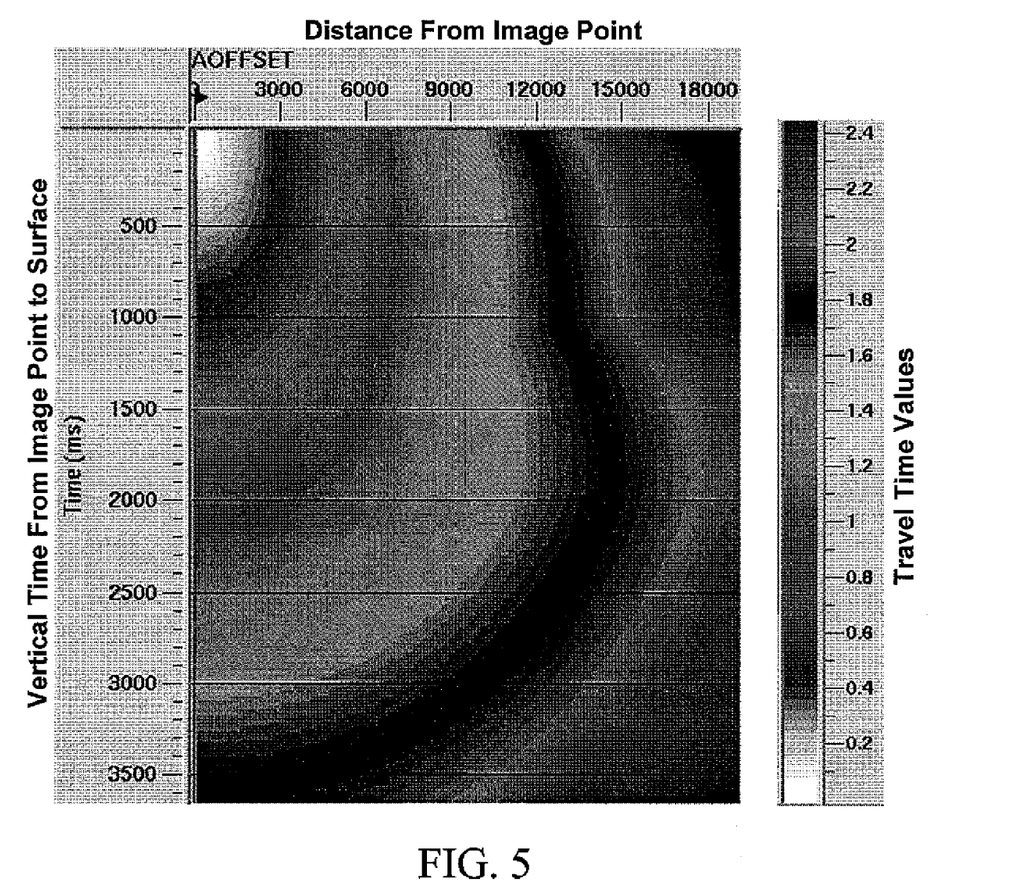
FIG. 5 shows a travel time table.

The travel time tables are computed from two velocity functions. The two velocity functions are computed by multiplying the input velocity function by the percent magnitude value and then adding the result to the input velocity and subtracting the result from the input velocity. Using the two computed velocity functions, two travel time tables are computed. These two travel time tables are stored for use in the migration algorithm. FIG. 5 shows an example of a travel time table.

Figure 6:
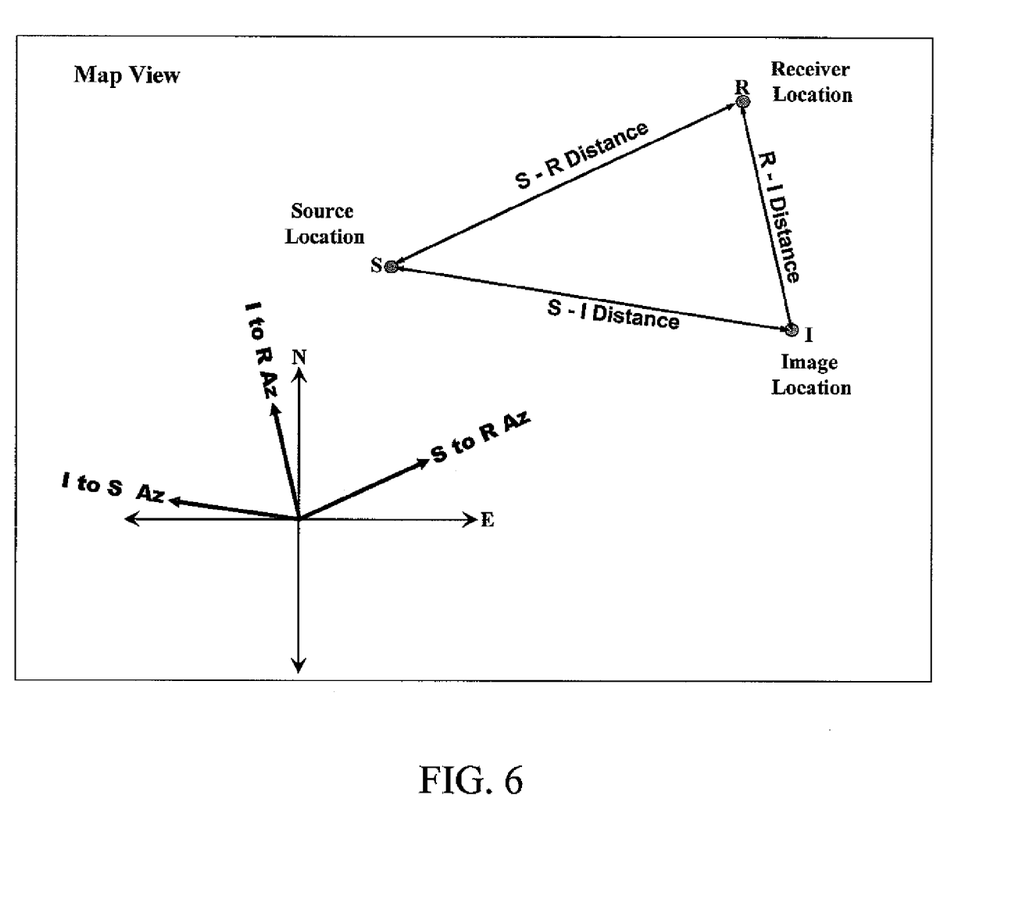
FIG. 6 shows, in map view, the distances and azimuths between the source, the image point location, and the receiver.

FIG. 3 shows the source location S, the image point I, the surface location O of the image point I, and the receiver location G. The travel time t from the source S to the image point I to the receiver G is computed using the steps Illustrated in FIG. 7. FIG. 6 shows a map view of the surface locations for the source, the image point, and the receiver. The corresponding distances and azimuths are indicated in FIG. 6.

Figure 7:
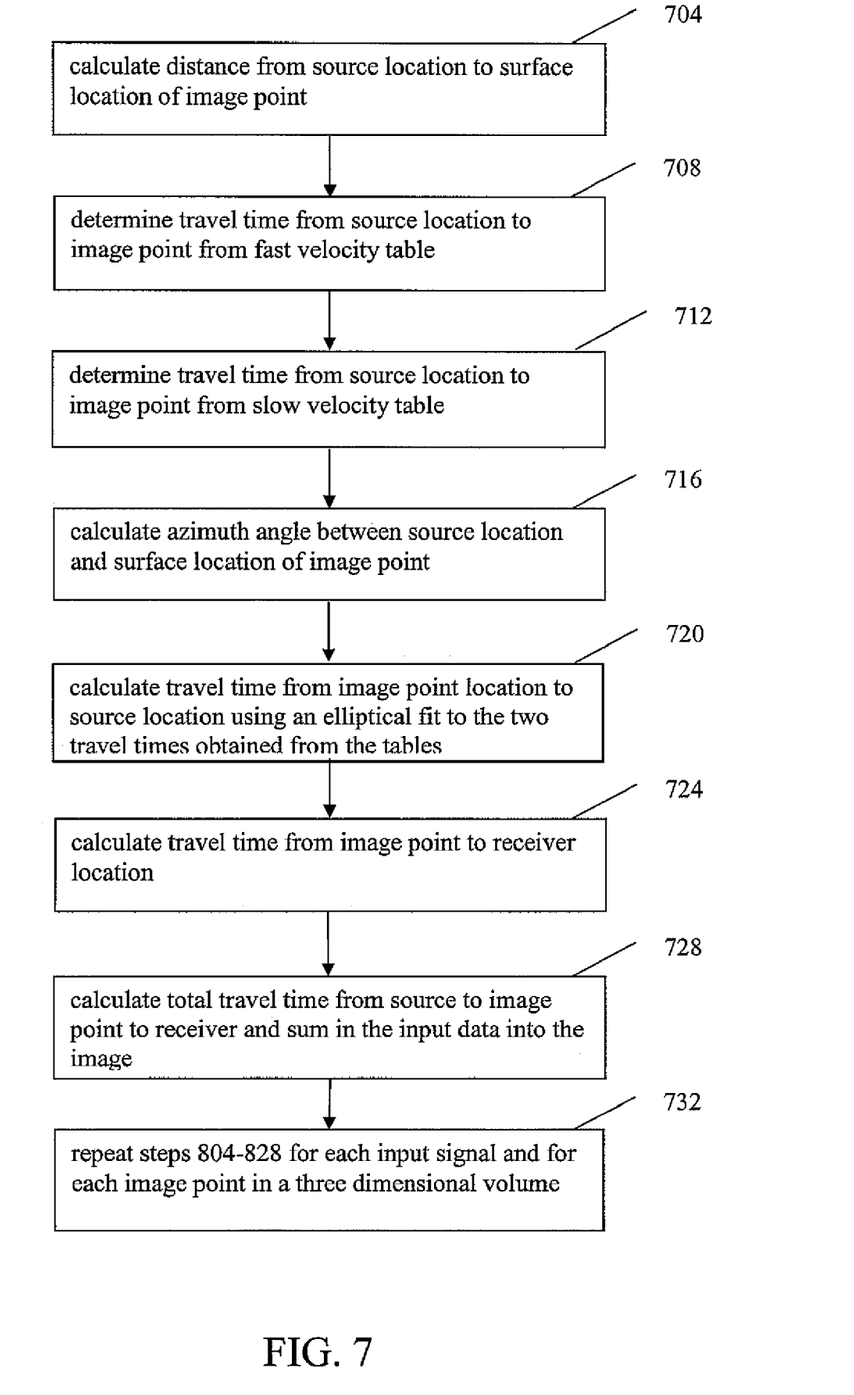
FIG. 7 is a flow diagram of the steps for calculating the travel time t from the source S to the image point I to the receiver G.

The two travel time tables and the azimuth direction of the fast velocity are used as input for each image point. Referring now to FIG. 7, in step 704, for each image point, the distance along the surface from the image point to the source location is computed from the input location data (S-I Distance in FIG. 6). In steps 708 and 712, two travel times are computed, one from each travel time table. In step 716, the azimuth direction from the image point to the surface location of the source is computed (I to S Az in FIG. 6). In step 720, using the travel time from the slow velocity table as the major axis of an ellipse and the travel time from the fast velocity table as the minor axis of the ellipse, the desired travel time for the image point to the surface location of the source is computed. The computation is carried out using an elliptical formula with the two travel times from the tables as the axes of the ellipse. The value of the ellipse for the azimuthal direction from the image point to the source location is the desired travel time for the image point to the source location. In step 724, the process is repeated for the receiver location using R-I Distance and I to R Az shown in FIG. 6. Note that the same travel time tables are used for both the source to image point calculation and the receiver to image point calculation. In step 728, the total travel time for the signal propagation from the source to the image point to the receiver is calculated.

The amplitude data from the input signal (i.e., seismic signal from the source) at the calculated travel time is summed into the output image. In step 732, steps 704 through 728 are repeated for each input signal and for each image point in the 3D volume.

Figure 9:
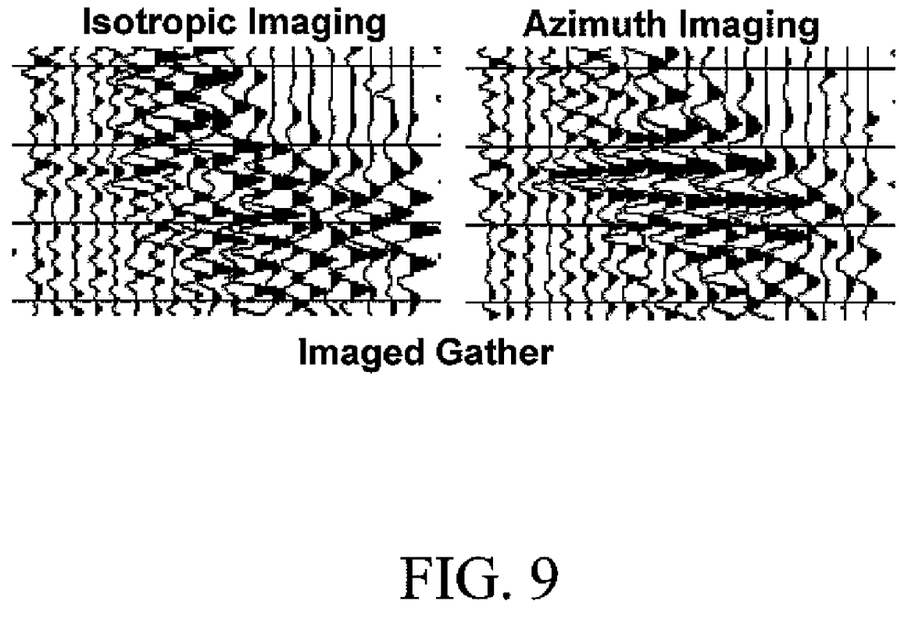
FIG. 9 compares the signal quality when isotropic migration methods are used and when azimuthal velocity variations are accounted for in the migration method.

Utilizing the azimuthal information in computing the travel times for the migration algorithm yields travel times that can be significantly different from the travel times computed for isotropic migration as illustrated in FIGS. 9A and 9B. A collection of signals after migration using travel times for isotropic migration is illustrated in FIG. 9A. FIG. 9B illustrates a collection of signals after migration using travel times for azimuthal migration. As shown in FIG. 9B, the reflection event is significantly improved when azimuthal travel times are used in the migration. It will be apparent to those skilled in the art how to utilize the signals incorporating the azimuthal variations in velocity in accordance with the present invention to evaluate the geometry and properties of subsurface rocks and other seismic data processing tasks.

In another embodiment of the invention, the travel times for azimuthal migration are determined by manipulating the fast and slow velocities directly. First, the fast velocity and slow velocities for each surface location are computed and stored. Next, for an image point to a source or receiver location, the velocity for the azimuth direction is calculated using an elliptical model and the fast and slow velocities. The calculated velocity is used in an analytical equation to obtain the desired travel time for migration. In this embodiment, the travel times are not pre-computed or stored and the elliptical model is applied to the fast and slow velocities rather than the travel times.

Figure 8:
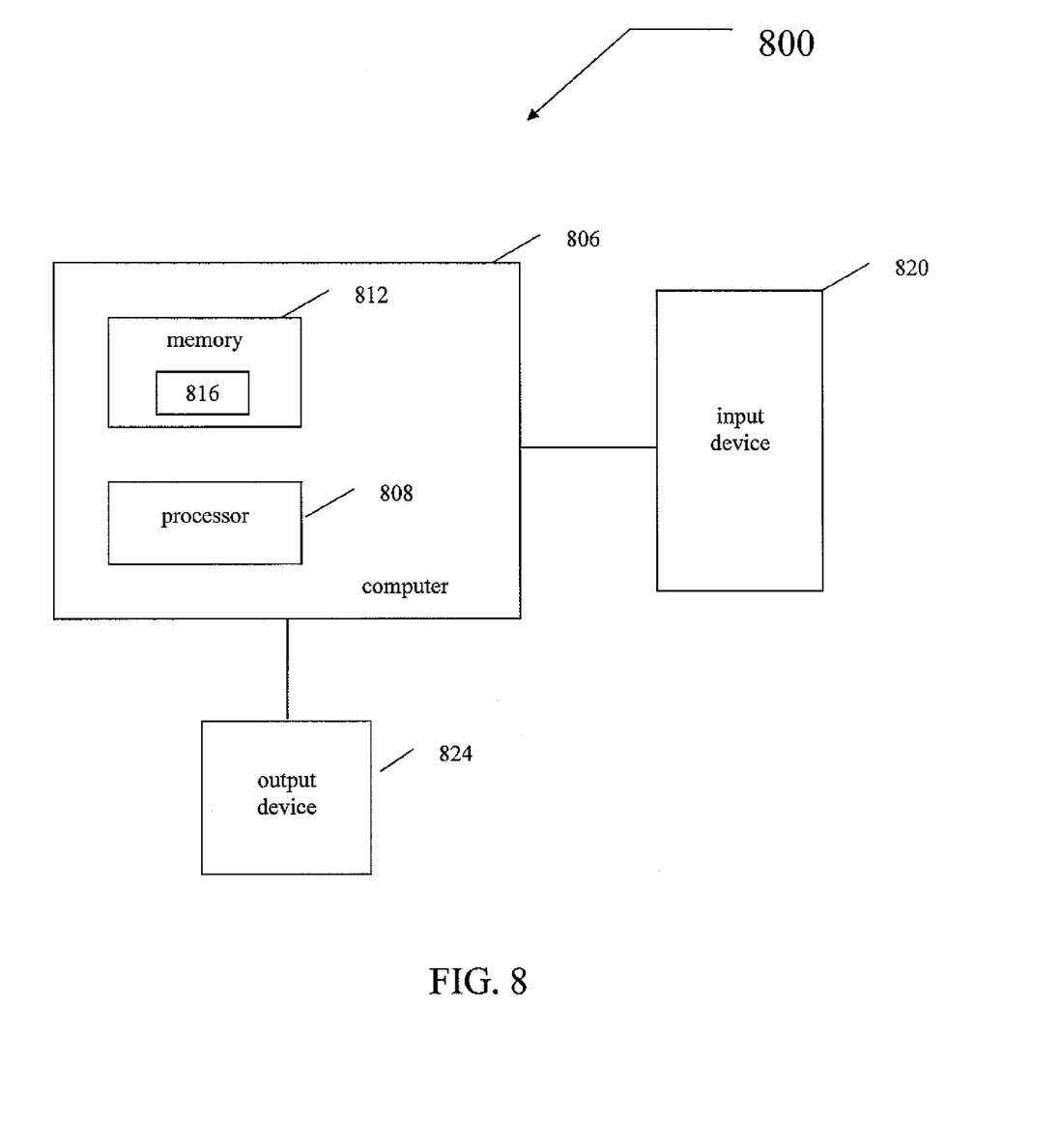
FIG. 8 is a computer system configured to carry out the steps in accordance with one embodiment of the invention.

FIG. 8 is a system 800 configured to carry out the steps in accordance with one embodiment of the invention. The system comprises a computer 804 having a processor 808 and a memory 812. A program code 816 for carrying out the steps (e.g., steps shown in FIG. 7) of the invention resides in the memory 812. An input device 820 is configured to receive seismic data and adapted to provide the seismic data to the processor. The processor 808 is configured to execute the program code 816, thus carrying out the steps in accordance with one embodiment of the invention. The system 800 includes an output device such as a monitor or a printer to output the results.

The program code for carrying out various steps of the invention can be written in computing language such as C, C++, assembly language, etc. The program code can be stored in any storage medium such as a hard drive, a CD ROM or any other memory device.

It will be understood by those skilled in the art, that the travel times can be calculated using ray trace methods or any other alternative method.

While the structures, apparatus and methods of this invention have been described in terms of preferred embodiments, it will be apparent to those of skill in the art that variations may be applied to the structures, apparatus and/or methods and in the steps or in the sequence of steps of the method described herein without departing from the concept, spirit and scope of the invention. For example, various distances, travel times, and azimuthal angles discussed in the foregoing can be calculated using one or more methods that will be apparent to those skilled in the art. All such substitutes and modifications apparent to those skilled in the art are deemed to be within the spirit, scope and concept of the invention as defined by the appended claims.

What is claimed is:

1. A method of seismic data processing for migration that incorporates variations in velocity with azimuth, the method utilizing a plurality of seismic energy sources and seismic receivers located at known positions at the surface of the earth and a plurality of image points located at predetermined depths beneath the surface, each seismic energy source generating one or more seismic signals that propagate into the earth and return to the surface where the seismic signals are received by the seismic receivers, the method comprising the steps of:

determining a distance from the energy source to the surface location of the image point;

determining a fast travel time of the seismic signal from the energy source to the image point;

determining a slow travel time of the seismic signal from the energy source to the image point;

determining an azimuth angle between the energy source and the surface location of the image point;

determining a first azimuth dependent travel time for the seismic signal traveling from the energy source to the image point using the fast travel time, the slow travel time, the azimuth angle of the fast velocity direction, and the azimuth angle of the energy source location to the image point location on the surface;

determining a distance from the receiver to the surface location of the image point;

determining a fast travel time of the seismic signal from the receiver to the image point;

determining a slow travel time of the seismic signal from the receiver to the image point;

determining an azimuth angle between the receiver and the surface location of the image point;

determining a second azimuth dependent travel time for the seismic signal traveling from the receiver to the image point using the fast travel time, the slow travel time, the azimuth angle of the fast velocity direction, and the azimuth angle of the receiver location to the image point on the surface;

calculating the total travel time for the seismic signal traveling from the energy source to the image point to the receiver by adding the first and second azimuth dependent travel times;

summing the amplitudes of the input signal at the computed travel time into the output signal;

repeating the foregoing steps for a plurality of image points beneath the surface of the earth for all of the energy source locations and receiver locations where signals have been recorded;

calculating the total travel time for each input signal; and summing the input signal into the output image.

2. The method of claim 1 wherein a fast travel time is calculated using the distance from the energy source to the surface location of the image point, the travel time from the surface location of the image point to the image point, and a fast velocity table.

3. The method of claim 1 wherein a slow travel time is calculated using the distance from the energy source to the surface location of the image point, the travel time from the surface location of the image point to the image point, and a slow velocity table.

4. A method of seismic data processing for migration that incorporates variations in velocity with azimuth, the method utilizing a plurality of seismic energy sources and seismic receivers located at known positions at the surface of the earth and a plurality of image points located at predetermined depths beneath the surface, each seismic energy source generating one or more seismic signals that propagate into the earth and return to the surface where the seismic signals are received by the seismic receivers, the method comprising the steps of:

determining the distance from the energy source to the surface location of the image point;

determining the fast travel time of the seismic signal from the energy source to the image point;

determining the slow travel time of the seismic signal from the energy source to the image point;

determining the azimuth angle between the energy source and the surface location of the image point;

determining a first azimuth dependent travel time for the seismic signal traveling from the energy source to the image point using the fast travel time, the slow travel time, the azimuth angle of the fast velocity direction, and the azimuth angle of the energy source location to the image point location on the surface;

determining the distance from the receiver to the surface location of the image point;

determining the fast travel time of the seismic signal from the receiver to the image point;

determining the slow travel time of the seismic signal from the receiver to the image point;

determining the azimuth angle between the receiver and the surface location of the image point; and determining a second azimuth dependent travel time for the seismic signal traveling from the receiver to the image point using the fast travel time, the slow travel time, the azimuth angle of the fast velocity direction, and the azimuth angle of the receiver location to the image point on the surface, wherein the calculation of the first azimuth dependent travel time for the seismic signal traveling from the energy source to the image point comprises:

fitting an ellipse to the fast and slow travel times using the slow travel time as the major axis and the fast travel time as the minor axis;

determining the angle difference between the azimuth angle of the fast axis and the azimuth angle between the energy source and the surface location of the image point;

determining, using the difference angle in the equation for the ellipse, the travel time from the azimuth of the energy source to the image point.

5. The method of claim 4, wherein the fast travel time is calculated using the distance from the receiver to the surface location of the image point, the travel time from the surface location of the image point to the image point, and a fast velocity table.

6. The method of claim 4 wherein the slow travel time is calculated using the distance from the receiver to the surface location of the image point, the travel time from the surface location of the image point to the image point, and a slow velocity table.

7. A method of seismic data processing for migration that incorporates variations in velocity with azimuth, the method utilizing a plurality of seismic energy sources and seismic receivers located at known positions at the surface of the earth and a plurality of image points located at predetermined depths beneath the surface, each seismic energy source generating one or more seismic signals that propagate into the earth and return to the surface where the seismic signals are received by the seismic receivers, the method comprising the steps of:

determining the distance from the energy source to the surface location of the image point;

determining the fast travel time of the seismic signal from the energy source to the image point;

determining the slow travel time of the seismic signal from the energy source to the image point;

determining the azimuth angle between the energy source and the surface location of the image point;

determining a first azimuth dependent travel time for the seismic signal traveling from the energy source to the image point using the fast travel time, the slow travel time, the azimuth angle of the fast velocity direction, and the azimuth angle of the energy source location to the image point location on the surface;

determining the distance from the receiver to the surface location of the image point;

determining the fast travel time of the seismic signal from the receiver to the image point;

determining the slow travel time of the seismic signal from the receiver to the image point;

determining the azimuth angle between the receiver and the surface location of the image point; and determining a second azimuth dependent travel time for the seismic signal traveling from the receiver to the image point using the fast travel time, the slow travel time, the azimuth angle of the fast velocity direction, and the azimuth angle of the receiver location to the image point on the surface, wherein the determination of the second azimuth dependent travel time for the seismic signal traveling from the receiver to the image point comprises the steps of:

fitting an ellipse to the fast and slow travel times using the slow travel time as the major axis and the fast travel time as the minor axis;

computing the angle difference between the azimuth angle of the fast axis and the azimuth angle between the receiver and the surface location of the image point;

determining, using the difference angle in the equation for the ellipse, the travel time from the azimuth of the receiver to the image point.

8. The method of claim 7, wherein the first and second travel times are summed to compute the total travel time for the seismic energy to travel from the energy source to the image point to the receiver.

9. A system for seismic data processing by incorporating the azimuthal variations of the velocity of seismic signals, comprising:

a computer comprising;

a processor;

a memory coupled to the processor;

an input device coupled to the processor and adapted to receive seismic data and to provide the seismic data to the processor, a program code stored in the memory and executable by the processor to process the seismic data by performing the following steps:

determining the distance from an energy source to an image point;

determining the fast travel time of the seismic signal from an energy source to an image point;

determining the slow travel time of the seismic signal from the energy source to the image point;

determining the azimuth angle between the energy source and the surface location of the image point, determining a first azimuth dependent travel time of the seismic signal traveling from the energy source to the image point;

determining the distance from a receiver to an image point;

determining the fast travel time of the seismic signal from a receiver to an image point;

determining the slow travel time of the seismic signal from the receiver to the image point;

determining the azimuth angle between the receiver and the surface location of the image point, determining a second azimuth dependent travel time of the seismic signal traveling from the image point to the receiver;

calculating the total travel time by adding the first and second azimuth dependent travel times;

summing the amplitudes from the input signals at the total travel time, wherein the signals are phase adjusted according the Kirchhoff imaging criteria and then summed into the output image at the image point; and repeating the foregoing steps for a plurality of image points beneath the surface of the earth and calculating the total travel time for the plurality of image points, wherein the determination of the azimuth dependent travel times for the seismic signal traveling from the energy source of the receiver to the image point comprises the steps of:

fitting an ellipse to the fast and slow travel times using the slow travel time as the major axis and the fast travel time as the minor axis;

computing the angle difference between the azimuth angle of the fast axis and the azimuth angle between the energy source or the receiver and the surface location of the image point;

determining, using the difference angle in the equation for the ellipse, the travel time at the azimuth of the energy source or the receiver to the image point.

* * * * *